United States Patent [19]

Alexandrino

[11] Patent Number: 4,538,405
[45] Date of Patent: Sep. 3, 1985

[54] PORTABLE COFFEE HARVESTING MACHINE

[76] Inventor: Victor M. Alexandrino, P.O. Box 882, Fajardo, P.R. 00648

[21] Appl. No.: 497,594

[22] Filed: May 24, 1983

Related U.S. Application Data

[63] Continuation-in-part of Ser. No. 329,865, Dec. 11, 1981, abandoned.

[51] Int. Cl.$^3$ ............................................. A01D 46/06
[52] U.S. Cl. ........................................ 56/330; 56/332
[58] Field of Search ................. 56/126, 127, 128, 129, 56/130, 327 R, 327 A, 330, 331, 27.5, 332

[56] References Cited

U.S. PATENT DOCUMENTS

| | | | |
|---|---|---|---|
| 968,742 | 8/1910 | Conceicao | 56/330 |
| 1,077,640 | 11/1913 | Randall | 56/330 |
| 1,480,825 | 1/1924 | Le Nove | 56/339 |
| 2,259,964 | 10/1941 | Sussman | 185/37 |
| 3,077,720 | 2/1963 | Grove et al. | 56/328 R |
| 3,389,543 | 6/1968 | Clark | 56/328 R |
| 3,530,654 | 9/1970 | Staats, Sr. et al. | 56/328 R |
| 3,543,494 | 12/1970 | Bartram | 56/328 R |
| 3,838,559 | 10/1974 | Stang et al. | 56/327 R |

FOREIGN PATENT DOCUMENTS 1342445 9/1963 France ................................. 56/332

Primary Examiner—Robert P. Swiatek
Assistant Examiner—David I. Tarnoff
Attorney, Agent, or Firm—Berman, Aisenberg & Platt

[57] ABSTRACT

A harvesting apparatus and method which are preferably employed for harvesting coffee berries are disclosed. The apparatus includes rotating spindles with helicoidal threads. In one embodiment, the spindles are driven by a motor, and in a second embodiment, the spindles rotate for engaging the berries or the branch as the operator moves the apparatus along a branch. The embodiment without a motor drive is ultra-light and may be operated without fatigue. The threads are designed to pull the fruit to be harvested off a branch and throw it free of the apparatus. The fruit may be collected by placing a net on the ground so that the fruit falls into it. In a preferred embodiment a small basket surrounds the rotating spindles to catch harvested berries.

10 Claims, 9 Drawing Figures

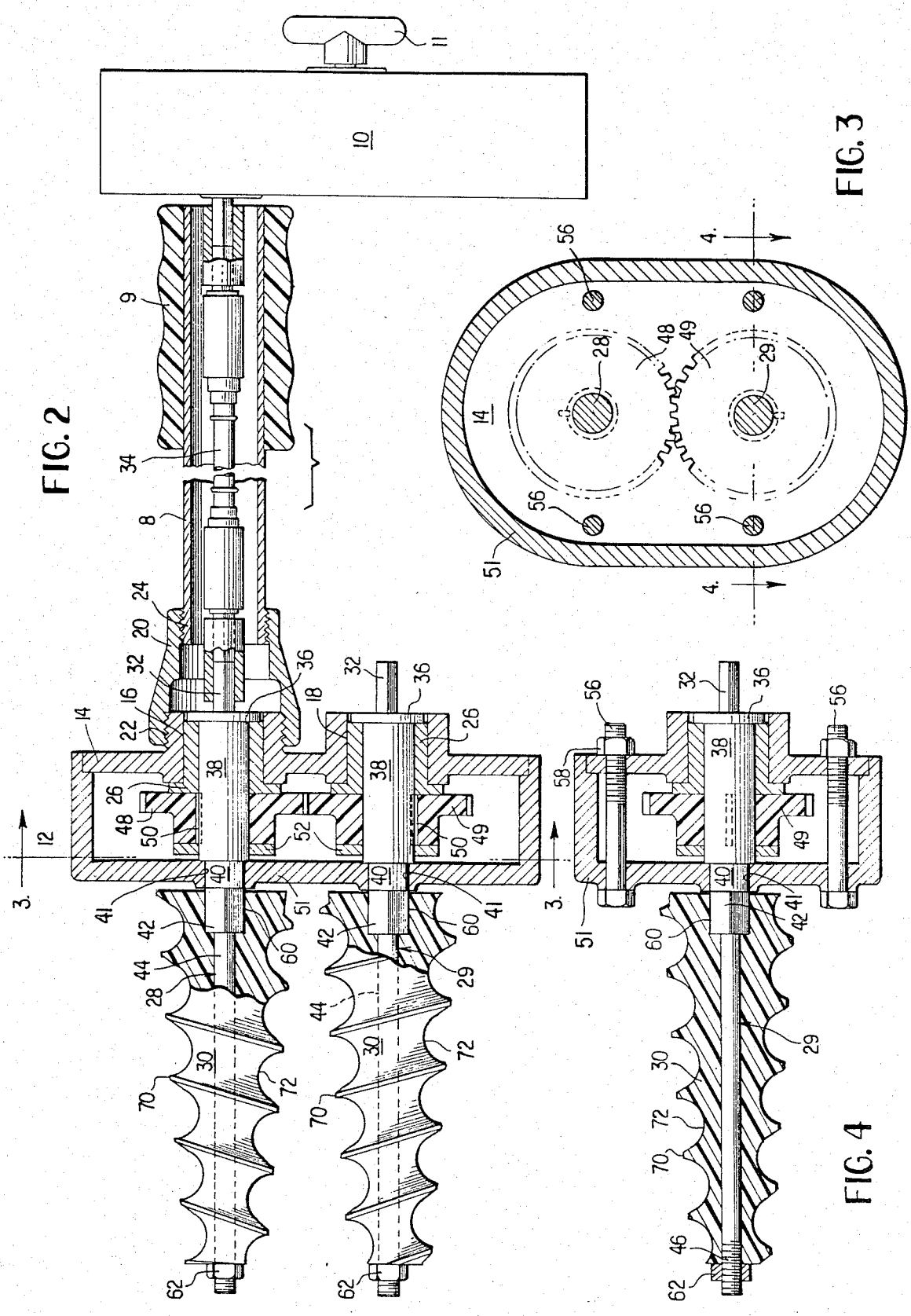

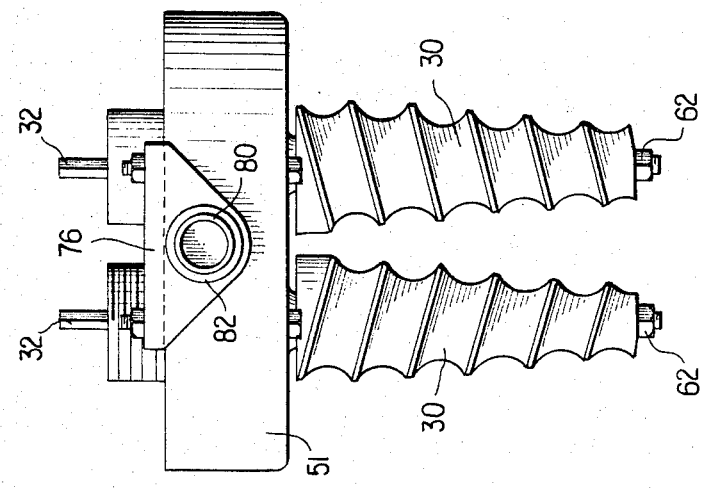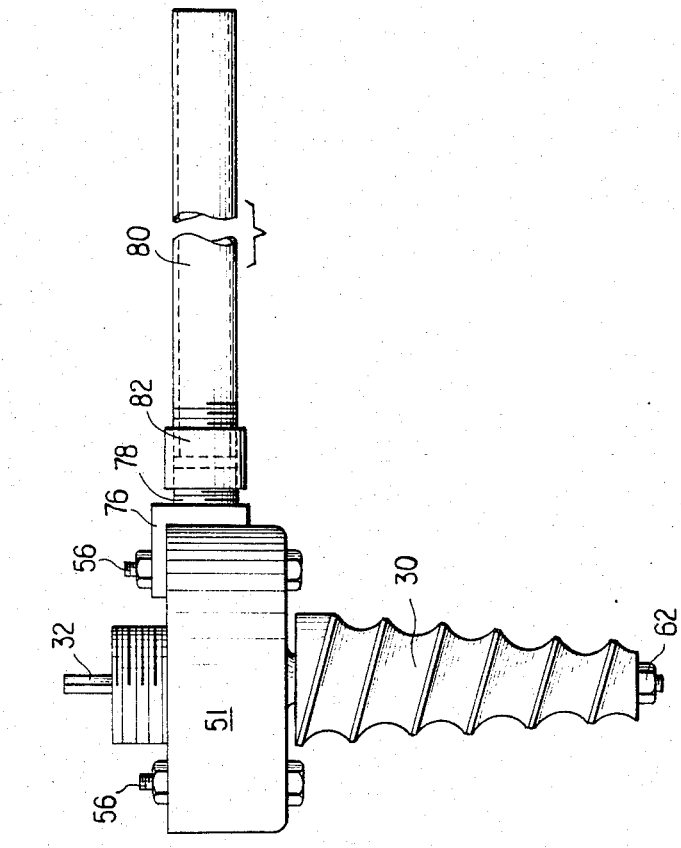

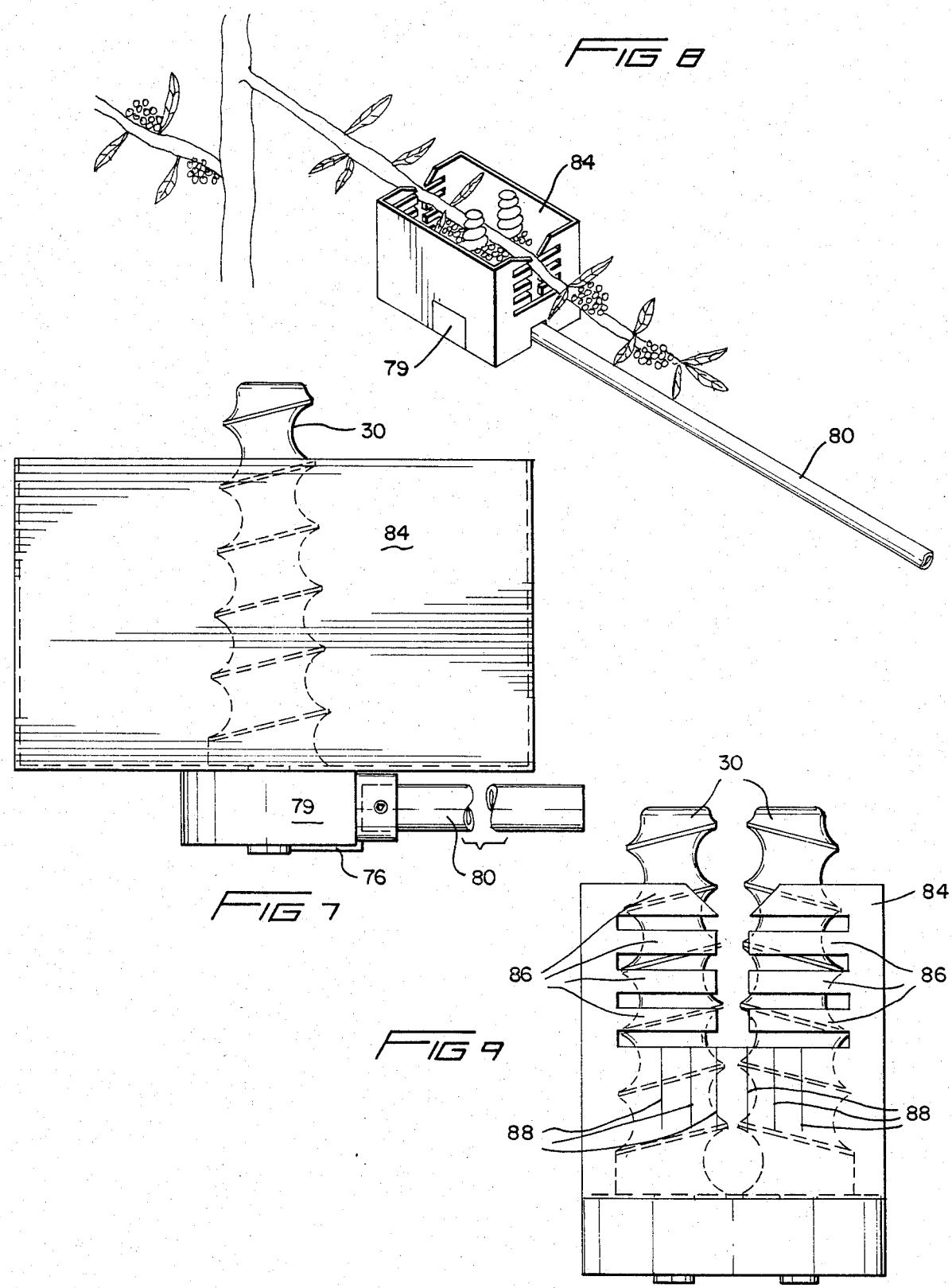

PORTABLE COFFEE HARVESTING MACHINE

This is a continuation-in-part of application Ser. No. 329,865 filed Dec. 11, 1981, which is now abandoned.

TECHNICAL FIELD

This invention relates to a method and apparatus for the harvesting of coffee berries or similar fruit. The invention may also be useful for the harvesting of castor oil seeds.

BACKGROUND ART

While coffee producing countries generally have an excess of inexpensive labor, when the coffee crop is ripe, much of the crop cannot be harvested because slow hand labor is used and because of time limitations. Presently, coffee berries are picked by hand since there is no effective mechanical harvesting apparatus available.

Fruit pickers which generally employ fingerlike elements to remove fruit from branches are known in the art. In U.S. Pat. No. 1,077,640 to Randall, there is shown a fruit picker with rotatable, parallel cylinders. The cylinders are placed on opposite sides of a branch holding fruit to be harvested, and when they come into contact with the fruit they break the stems of the fruit, thus allowing the fruit to fall from the tree.

In the apparatus shown by U.S. Pat. No. 968,742 to Conceicao, there is disclosed a rake having teeth which comprise freely rotatable smooth cylinders. These cylinders are not driven by a power source and are not connected to rotate together. The rake catches fruit between the teeth and thus pulls it off the branch.

In U.S. Pat. No. 3,522,697 to Shaff, a device for picking fruit includes a set of fingers which reciprocates to shake fruit off of a branch.

In U.S. Pat. No. 3,164,942 to Middlesworth et al., an apparatus is provided which has a grid of rotating augers for entering a fruit bush and removing the fruit from the branches. These augers are shaped like corkscrews and rotate about parallel axes.

Other fruit picking devices are known in the art, such as those shown by U.S. Pat. No. 3,925,973 to Glover; No. 2,901,879 to Jones; Nos. 1,278,175 and 1,185,110 to LeBaron; and No. 3,452,527 to Steingas et al.

STATEMENT OF THE INVENTION

Large coffee-producing countries such as Brazil, Colombia, Malagasy, West Africa, Mexico, El Salvador, Guatemala, Indonesia, and Uganda have sufficient cheap hand labor but when the full crop ripens there is not enough time for hand picking. In such cases a large part of the crop drops to the ground, cannot be recovered and is lost to decay. Up to one-half of the crop is sometimes lost due to the lack of an efficient method of mechanical harvesting.

The coffee plant is a shrub with evergreen leaves which grows to a height of about 12 feet. The stem and branches are relatively thin and the fruit, or berries, are hand-picked from the ground. Branches above the height of the coffee picker have to be pulled down for harvesting. Coffee branches, although relatively thin throughout their lengths, are formed by woody fiber and are not easily broken by pulling or jerking. This characteristic is another advantage for mechanical harvesting of the crop. Pruning is a common practice among farmers to keep the branches within the reach of the laborers in harvesting.

Each coffee bean is covered by an outer parchment-like skin, followed by a thin inner covering called the "silver skin". Both of these skins are removed by hulling and peeling in milling machines, and are finally discarded by blowers.

The clean beans are now ready for market. Coffee beans are flexible without being brittle, not easily broken, strong, film, tenacious and able to endure mechanical hardships.

In the process of preparation after harvest, the berries and then the beans are subjected to mechanical strain. The tough consistency of the beans, however, prevents harmful effects in shape or consistency.

It is apparent that there is a great need for a portable coffee harvesting machine which provides for a rapid withdrawal of the berries from the coffee branches. It is an object of this invention to fill this need.

A further object of this invention is to reduce coffee cropland resulting in more efficient crop management and land management. With an efficient method of mechanical harvesting about 95% of all coffee crops would be harvested leading to surplus coffee production, since about one-half of the coffee crops are lost since there is no efficient method of mechanical harvesting. Coffee areas could then be reduced to fill required market needs, and soils now used for coffee growing could be used for other crops.

A further object of this invention is the coordination of harvesting of coffee berries with the use of regulators to control the ripening of the berries for a more efficient and effective mechanical harvesting.

The invention is a portable harvesting apparatus which provides a plurality of rotating helicoidal spindles for removing fruit, particularly coffee berries, from a branch. One embodiment of the apparatus includes a motor and a shaft, driven by the motor, for rotating one of the helicoidal spindles. A second helicoidal spindle is driven through a gear arrangement by the first helicoidal spindle so that it rotates in a direction opposite to that of the first spindle. The first spindle may, for example, rotate in a clockwise direction and have a lefthand thread, while the second spindle rotates in a counterclockwise direction and has a righthand thread. This combination of thread direction and rotation allows the two spindles to pull the coffee berries from the branch. The coffee berries fall to the group, and may be collected in a net which has been placed on the ground beneath the tree, or in a basket which surrounds the spindles.

The spindles in the first embodiment are supported by an elongated tube which has a handle adapted to be grasped by a harvester utilizing the apparatus. The shaft which drives the first spindle is coaxial with the tube, and the motor is located at the lower end of the tube. In one embodiment, the motor is a spring-driven motor operated by winding a spring, but any motor such as an internal combustion engine may be used to drive the spindles.

While the spindles have been described as rotating in such a direction that the fruit will be pulled into the apparatus, it may be desirable in some instances to arrange the spindles so that they drive the fruit away from the spindles, such as by reversing the rotation direction of the motor.

In a second embodiment of the invention, the above-described motor is not used, and the harvester resembles a rake. A head portion carries the two helicoidal spindles which are connected by gears to cause them to rotate in opposite directions. The spindles are placed on opposite sides of a branch containing berries and are pulled or pushed along the branch. Contact of the branch and berries with the spindles causes them to rotate, and since the spindles are connected together by a gear arrangement, they always rotate to maintain a fixed relationship between the crests and the roots of the spindles.

The handle of the second embodiment extends transverse to the direction of the spindles to facilitate use of the apparatus as a rake.

A basket may be provided to surround the spindles of second embodiment in such a manner that harvested berries fall into the basket. The operator then empties the basket into a large container such as is used in conventional coffee harvesting.

BRIEF DESCRIPTION OF THE DRAWINGS

FIG. 2 is a longitudinal cross section of the apparatus of the invention.

FIG. 3 is a cross section of the invention taken along line 3—3 of FIG. 2.

FIG. 4 is a cross section of the invention taken along line 4—4 of FIG. 3.

FIG. 5 is a side view of a second embodiment of the invention.

FIG. 6 is an end view of a second embodiment of the invention.

FIG. 7 is a side elevation of a preferred form of the second embodiment.

FIG. 8 is an illustration of harvesting with the embodiment shown in FIG. 7.

FIG. 9 is an end view of the harvester shown in FIG. 7.

DETAILED DESCRIPTION OF THE DRAWINGS

Figure 1:
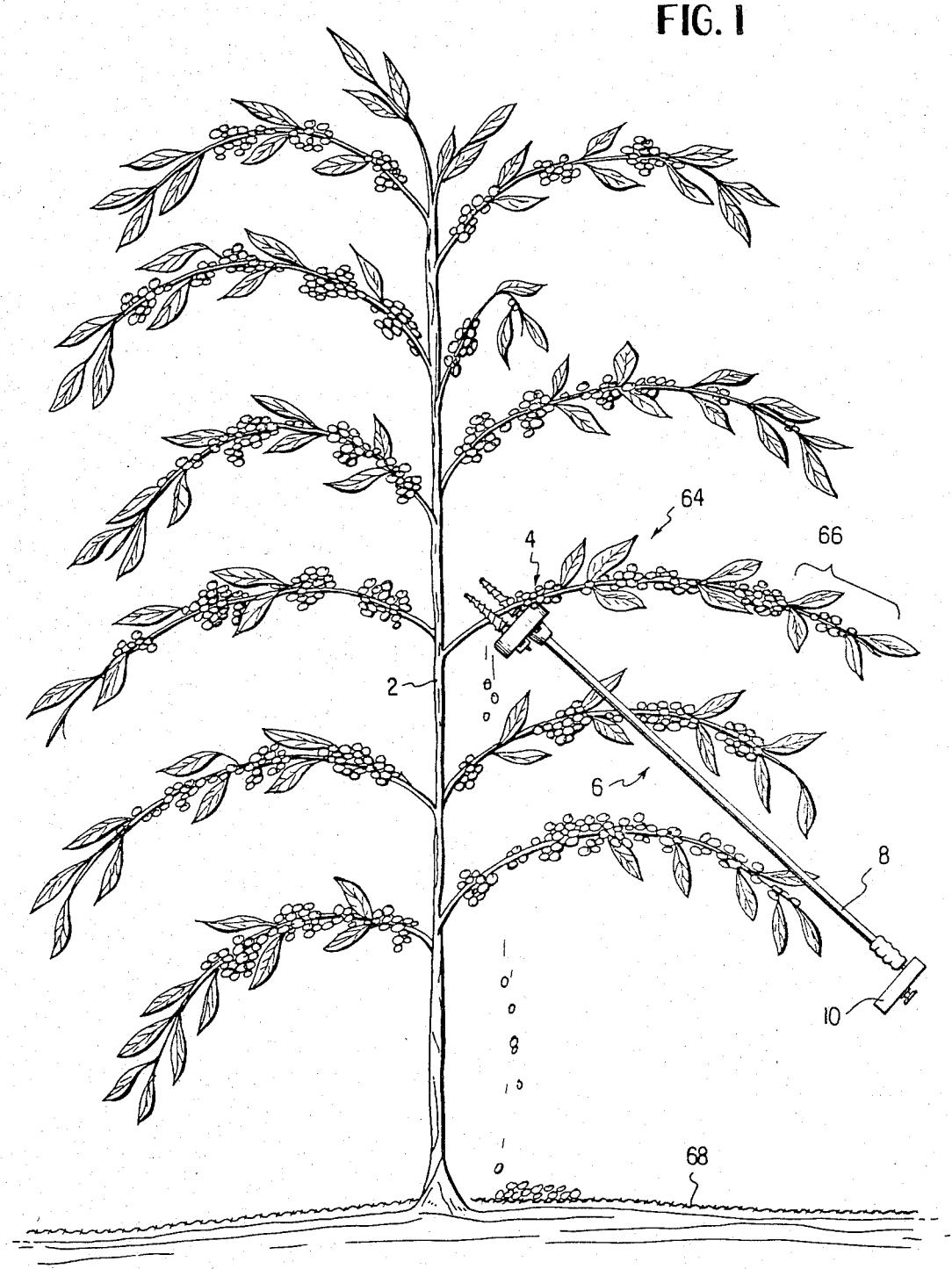
FIG. 1 is a view of the apparatus of the invention being used to harvest coffee berries from a coffee tree.

In FIG. 1, there is shown a coffee tree 2 having fruit 4. The harvesting machine of the invention is shown at 6. The fruit is shown falling onto a collecting means 68, which covers the ground beneath the tree.

The harvesting machine of the invention is shown in detail in FIG. 2. A support tube 8, which may be an aluminum pipe having a handle grip 9, extends between a motor 10 and the head of the apparatus. The motor 10 may be a spring motor with a wind-up key 11, or any other convenient motor. The head of the apparatus includes a base portion 14 having two holes 16 and 18 therein. The base portion 14 is secured to the support tube 9 by means of a coupler 10 having threads on each end which coooperate with threads 22 on the base member and threads 24 on the support tube. Holes 16 and 18 are adapted to receive bushings 26. The bushings 26 receive shafts 28, 29 which support helicoidal spindles 30. The spindles 30 are conical and have threads 70 formed by helicoidal groove 72. The shaft 28 includes a pin 32 for engagement with a flexible shaft 34 which is coaxial with the support tube 8. The flexible shaft 34 is operatively connected to the motor 10. The shafts 28, 29 also have disk-like portions 36, large diameter cylindrical sections 38, reduced diameter cylindrical sections 40, square sections 42, second reduced diameter cylindrical sections 44, and threaded sections 46. The large diameter cylindrical sections 38 support gears 48, 49 which are secured to sections 38 by means of keyways 50 and keys. Thrust collars 52 are located on the large diameter cylindrical sections adjacent the gears 48, 49. The shafts 28, 29 are held to the base member 14 by a cover 51 which is secured by bolts (see FIGS. 3 and 4). Cover 51 has holes 41 for receiving cylindrical sections 40. The square sections 42 of the shafts 28, 29 mate with square holes 60 in the spindles 30. The spindles 30 are secured to shafts 28, 29 by means of nuts 62 which mate with threaded sections 46 of the shafts.

Thus, when the motor 10 rotates the flexible shaft 34, the shaft 28 is thereby rotated, which carries with it one of the helical spindles 30 and the gear 48. Rotation of gear 48 rotates the other gear 49 and the other spindle 30.

The helicoidal spindles 30 are of opposite handedness. That is, one of the spindles has a lefthand thread and the other has a righthand thread. The cooperation of the gears 48, 49 causes the two helicoidal spindles to rotate in opposite directions. It is preferable to operate the harvesting machine so that the fruit to be harvested is pulled toward the operator, that is, toward the wider portions of the spindles. Shaft 34 will be rotated in such a direction that the righthand spindle rotates clockwise and the lefthand spindle rotates counterclockwise when viewed from the operator's position.

The rotating spindles act to first pull the fruit toward the operator so as to break the stems, thus detaching the fruit from the branch. Then, the fruit is thrown free of the rotating spindles by the action of the rotation. Thus, the fruit is not damaged by getting caught between the spindles, but is thrown free for later collection.

As shown in FIG. 1, the berries 4 on a coffee tree 2, which are desired to be harvested, are located on the inner portion of the branch. The berries located in the area 64 are mature and ready for harvest, while the berries located in the area 66 are generally undeveloped when the other berries are ready for harvest. The berries in the area indicated at 66 are ordinarily not harvested because they mature later and their harvest is not economically feasible, even if picked by hand.

In a properly managed program, chemicals are applied to the coffee trees which promote an even maturation of the berries located in area 64. One such chemical is known by the trademark Ethrel. Thus, all of the berries are mature and ready for harvesting, and the operator need only utilize the tool of the invention to remove the berries from the branches.

One useful method of gathering the berries is to spread a cloth 68 on the ground beneath the tree so that when the berries fall from the tree, they may be easily collected by picking up the cloth 68. Another method, which uses a basket associated with the spindles will be described below.

In operation, the harvester would grasp the harvesting apparatus by a handle 9 and would guide the spindles along a branch having berries to be harvested, with the branch between the spindles. The motor, if a spring motor is used, would have been wound and the rotating spindles will pull the berries from the branch and allow them to fall to the ground.

FIGS. 5-9 show a second embodiment of the invention wherein the helicoidal spindles 30 are used as a rake. A bracket 76 may be attached to the apparatus shown in FIGS. 2-4 by two of the bolts 56. The bracket 76 includes a threaded protrusion 78 which extends perpendicularly to the bolts 56. A handle 80 is secured to the threaded protrusion 78 by a coupler 82. This embodiment allows the spindles 30 to extend transversely from the handle 80 so that the operator may use the apparatus in the manner of a rake to harvest coffee.

In the second embodiment, the handle 8 and motor 10 are normally not used and are disconnected from the base member 14. Alternatively, the handle 8 is replaced by the handle 80, and the spindles 30 are still driven by flexible cable 34.

A preferred form of the second embodiment is shown in FIGS. 7-9. This harvester 79 is designed to operate only as a rake and thus lacks the threaded extensions shown in FIGS. 5 and 6 which are used to alternatively attach a motor drive unit. The harvester of FIGS. 7-9 is much lighter than the other embodiments, and when made of a suitable plastic, weighs between one and two pounds. The two helicoidal spindles 30 are mounted in a manner essentially identical to that shown in FIGS. 2-4, and the spindles are connected by gears to provide coordinate rotation of the spindles in opposite directions.

A basket 84 surrounds the spindles 30 and is mounted to cover 51 in any convenient manner. The basket 84 may have a flat bottom, as shown in FIG. 7 or it may have a recess as shown in FIG. 8 for receiving the harvester 79 so that the bottom of the basket extends downwardly around the harvester thus providing more volume for the harvested beans.

As shown in FIGS. 8 and 9, the basket 84 has a plurality of flexible fingers 86 for allowing a branch and leaves of a coffee tree to pass, while retaining harvested berries in the basket. The area below the fingers has a plurality of cuts 88 to provide additional flexibility in this area.

The operation of the rake embodiment is shown in FIG. 8. The spindles are placed on either side of a branch laden with ripe coffee beans, and the operator either pulls the harvester toward him or pushes it away. The engagement of the spindles with the branch and the berries causes the spindles 30 to rotate. Since the spindles are connected for co-rotation in opposite directions they either pull the beans into the harvester or push them away, depending upon the handedness of the spindles and the action of the operator. When using the basket 84 it is preferable to draw the berries toward the harvester. Harvested berries then fall into the basket 84 and may be emptied into a conventional container located on the ground adjacent the tree.

The spindles are preferably arranged so that crests and roots of one spindle always face respective crests and roots of the other spindle.

The rake embodiment has shown surprising results in field testing. The rake is light enough to allow a worker to use it for an extended period of time without tiring. The spindles may be adjusted relative to the branch because of the helicoidal shape. When the branch has a large number of berries only the tips of the spindles which provide the largest separation will be used. As berries are removed, the branch may be moved further into the spindles so that the narrow spacing removes more berries.

It is claimed:

1. Apparatus for harvesting coffee berries comprising:
    (a) a base member;
    (b) first and second spindle means extending outwardly from said base member in a first direction for receiving a branch from a coffee plant therebetween in a direction transverse to said first direction and for engaging and removing said coffee berries from said branch, each of said spindle means being tapered with respect to an axis of rotation and having a helicoidal groove on an exterior surface, the helicoidal groove of said first spindle having a pitch opposite to the pitch of the helicoidal groove of said second spindle, the spacing between said helicoidal grooves increasing in said first direction whereby said coffee berries may be engaged between said helicoidal grooves and pulled from said branch by rotation of said spindles;
    (c) means coupling said first spindle to said second spindle to cause said first and second spindles to rotate in opposite directions;
    (d) handle means attached to said base member and extending outwardly therefrom;
    wherein said first and second spindles extend outwardly along respective first and second parallel axes; and
    wherein the helicoidal grooves on said first and second spindles are arranged so that crests and roots on said first spindle are aligned with crests and roots on said second spindle.

2. Apparatus according to claim 1 further comprising collection means at least partially surrounding said spindles to collect harvested berries.

3. Apparatus according to claim 2 wherein said collection means include opposed end walls with flexible means in aligned portions thereof to allow said branch to pass through said portions of said end walls.

4. Apparatus according to claim 3 wherein said spindles are freely rotatable.

5. Apparatus according to claim 1 further comprising power means to rotationally drive at least one of said spindle means.

6. Apparatus according to claim 5 further comprising a flexible shaft connecting said power means to one of said spindles.

7. Apparatus according to claim 6 wherein said power means is a spring-driven motor.

8. A method for the use of an apparatus for harvesting coffee, said apparatus comprising a base member, first and second spindle means extending outwardly from said base member in first and second directions, and coupling means for causing said first and second spindle means to rotate in opposite directions, each of said first and second spindle means being tapered along its length and having a helicoidal groove on an external surface, the pitch of the helicoidal groove on said first spindle being opposite to the pitch of the helicoidal groove on said second spindle, the spacing between said helicoidal grooves increasing in a direction away from said base member and being large enough at ends of said spindles remote from said base to allow a branch of a coffee tree and berries on said branch to be received between said first and second spindles, said method comprising the steps of placing said first and second spindles on opposite sides of said branch and moving said spindles along said branch to remove coffee berries from said branch.

9. A method in accordance with claim 8 wherein said first and second spindles are caused to rotate by engagement of one of said spindles with said branch or said berries.

10. A method in accordance with claim 8 wherein said apparatus further comprises means for causing rotation of one of said spindles.

* * * * *